(12) United States Patent
Zhao et al.

(10) Patent No.: US 9,710,048 B2
(45) Date of Patent: Jul. 18, 2017

(54) METHOD FOR DETECTING FALSE WAKE CONDITIONS OF A PORTABLE ELECTRONIC DEVICE

(75) Inventors: Hong Zhao, Naperville, IL (US); Dennis J. Budnick, Richmond, IL (US); Makarand M. Karvekar, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 624 days.

(21) Appl. No.: 13/251,632

(22) Filed: Oct. 3, 2011

(65) Prior Publication Data
US 2013/0082939 A1    Apr. 4, 2013

(51) Int. Cl.
*G06F 1/32* (2006.01)
*G06F 3/0488* (2013.01)

(52) U.S. Cl.
CPC .......... *G06F 1/3265* (2013.01); *G06F 1/3218* (2013.01); *G06F 3/0488* (2013.01); *Y02B 60/1242* (2013.01)

(58) Field of Classification Search
CPC .................................................... G06F 3/0488
USPC ........................................................ 345/173
See application file for complete search history.

(56) References Cited

U.S. PATENT DOCUMENTS

| 7,479,949 B2 | 1/2009 | Jobs et al. |
| 7,519,918 B2 | 4/2009 | Trantow |
| 7,606,552 B2 | 10/2009 | Orr et al. |
| 7,791,588 B2 | 9/2010 | Tierling et al. |
| 2004/0189603 A1* | 9/2004 | Arrigo et al. ................. 345/158 |
| 2005/0078093 A1 | 4/2005 | Peterson, Jr. et al. |
| 2005/0078903 A1 | 4/2005 | Grace et al. |
| 2008/0118152 A1 | 5/2008 | Thorn et al. |

(Continued)

FOREIGN PATENT DOCUMENTS

| CN | 101266516 A | 9/2008 |
| CN | 101356493 A | 1/2009 |
| EP | 2341417 A1 | 7/2011 |
| WO | 2009105821 A1 | 9/2009 |
| WO | 2010047932 A1 | 4/2010 |
| WO | 2010114841 A1 | 10/2010 |

OTHER PUBLICATIONS

U.S. Appl. No. 12/970,763, filed Dec. 16, 2010, in the name of Hong Zhao, entitled "Method and Apparatus for Activating a Function of an Electronic Device".

(Continued)

*Primary Examiner* — Kent Chang
*Assistant Examiner* — Chayce Bibbee
(74) *Attorney, Agent, or Firm* — Schumaker & Sieffert, P.A.

(57) ABSTRACT

There is described a portable electronic device capable of detecting false wake conditions, and a method thereof. The portable electronic device comprises a sensor circuit and a display. The sensor circuit detects double tap data associated with user input and motion data subsequent to the double tap data within a predetermined time period. The sensor circuit also determines whether the motion data corresponds to at least one criterion associated with non-user input. The display wakes from a sleep state in response to the sensor circuit determining that the motion data corresponds to the at least one criterion. For some embodiments, the sensor circuit includes a motion sensor to detect the motion data and a sensor hub to determine whether the motion data corresponds to the at least one criterion.

18 Claims, 6 Drawing Sheets

(56) References Cited

U.S. PATENT DOCUMENTS

| | | | |
|---|---|---|---|
| 2008/0284739 A1* | 11/2008 | Andrews et al. | 345/173 |
| 2009/0265671 A1 | 10/2009 | Sachs et al. | |
| 2010/0194682 A1 | 8/2010 | Orr et al. | |
| 2010/0201615 A1 | 8/2010 | Tupman et al. | |
| 2010/0256947 A1* | 10/2010 | Kim et al. | 702/141 |
| 2010/0321321 A1 | 12/2010 | Shenfield et al. | |
| 2012/0154292 A1 | 6/2012 | Zhao et al. | |

OTHER PUBLICATIONS

Hong Zhao, et al, "Method and Apparatus for Activating a Function of an Electronic Device", Dec. 16, 2010, U.S. Appl. No. 12/97-,763, 21 pages.

Patent Cooperation Treaty, "PCT Search Report and Written Opinion of the International Searching Authority" for International Application No. PCT/US2012/054562 dated Nov. 22, 2012, 12 pages.

Patent Cooperation Treaty, "PCT Search Report and Written Opinion of the International Searching Authority" for International Application No. PCT/US2011/061602 Mar. 7, 2012, 14 pages.

Ronkainen et al., "Tap Input as an Embedded Interaction Method for Mobile Devices" Proceedings of the 1st International Conference on Tangible and Embedded Interaction, Jan. 1, 2007, p. 263.

Notification of First Office Action from Chinese counterpart application No. 201280048870.5, issued Jan. 29, 2016 18 pgs.

Notification of Second Office Action from Chinese counterpart application No. 201280048870.5, issued Aug. 31, 2016 13 pgs.

Notification of Third Office Action from Chinese counterpart application No. 201280048870.5, issued Mar. 2, 2017 14 pgs.

* cited by examiner

METHOD FOR DETECTING FALSE WAKE CONDITIONS OF A PORTABLE ELECTRONIC DEVICE

CROSS REFERENCE TO RELATED APPLICATIONS

The present application is related to co-pending and commonly assigned U.S. application Ser. No. 12/970,763, filed on Dec. 16, 2010, from which benefits under 35 USC 120 are hereby claimed and the contents of which are incorporated herein by reference.

FIELD OF THE INVENTION

The present disclosure relates generally to an electronic device and more particularly to a method and apparatus for false wake conditions of the electronic device when detecting a double tap by the sensors of the device.

BACKGROUND OF THE INVENTION

Electronic devices, including mobile phones and other portable devices, are increasingly being upgraded with improvised applications and functionalities. For example, a mobile phone may include a touch-sensitive screen that enables one to interact directly with what is displayed, rather than indirectly with a cursor controlled by a mouse or a touchpad. The touch-sensitive screen can sense fingers, hands, and passive devices such as stylus. Thus, the touch-sensitive screen can be used to activate a function of the electronic device.

In the present systems, activating a function of the electronic devices by a double tap using an accelerometer has been proposed for many mobile phones. However, in existing conventional systems, extensive studies in feature prototype have shown that it is extremely difficult to achieve low falsing in certain cases, such as, while the mobile phone is in pocket, car cradle, etc. In other words, falsing is hard to overcome in certain cases, for example, in the car cradle, because the accelerometer alone cannot distinguish finger tap and periodic motion generated from a rough road.

DETAILED DESCRIPTION OF THE EMBODIMENTS

There is described a portable electronic device capable of, and method for, detecting false wake conditions. The function of waking-up a display is delayed subsequent to receiving double tap interrupt from a motion sensor of the device, such as an accelerometer. The device collects and analyzes the motion and/or acceleration data trailing the double tap event. The device distinguishes error or non-user input conditions from normal or user input conditions.

An aspect of the present invention is a portable electronic device capable of detecting false wake conditions, and a method thereof. The portable electronic device comprises a sensor circuit and a display. The sensor circuit detects double tap data associated with user input and motion data subsequent to the double tap data within a predetermined time period. The sensor circuit also determines whether the motion data corresponds to one or more criteria associated with non-user input. The display wakes from a sleep state in response to the sensor circuit determining that the motion data corresponds to the one or more criteria. For some embodiments, the sensor circuit includes a motion sensor to detect the motion data and a sensor hub to determine whether the motion data corresponds to the criterion or criteria.

Figure 1:
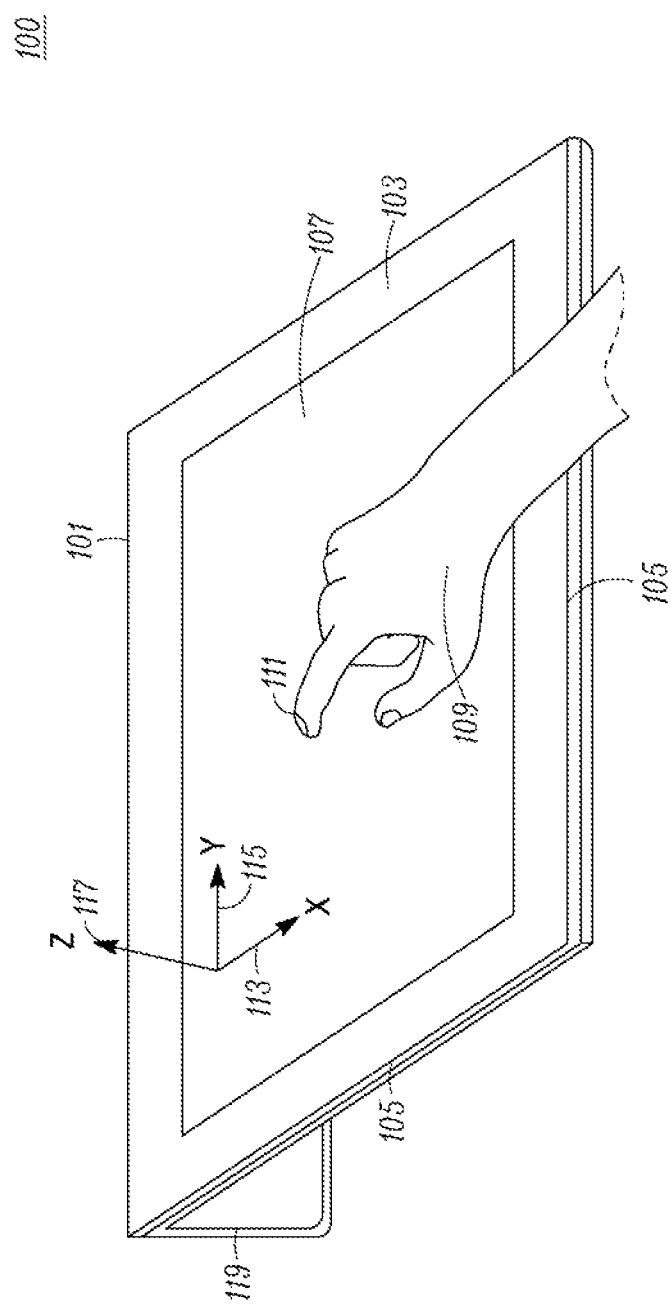
FIG. 1 is a perspective view of an embodiment of a portable electronic device in accordance with the present invention.

Referring to FIG. 1, there is provide a perspective view of an embodiment 100 of a portable electronic device 101 in accordance with the present invention. The portable electronic device 101 may be any type of device having an output component and one or more sensors to detect a double tap input by a user to wake up the output component. Examples of a portable electronic device 101 include, but are not limited to, a computing device, tablet device, hand-held device, productivity device, media player, media reader, communication device (wireless or wired), scanner, network browser, e-commerce device, measuring device, and the like. The portable electronic device 101 may have one of a variety of different form factors including, but not limited to, a tablet, candy bar, flip/clamshell, slider, qwerty slider, rotator, and the like. For the embodiment shown in FIG. 1, the device 101 has a front surface 103 and a plurality of side surfaces 105 substantially angled from the front surface.

The portable electronic device 101 includes at least one output component and at least one input component. For one embodiment, like the one shown in FIG. 1, the device 101 includes a touch screen 107 which functions as both an output component and an input component. For example, the touch screen 107 may include a display (such as an LCD, OLED, LED, and the like) having a touch sensor (capacitive, resistive, temperature, and the like) overlaying at least a portion of the display. The front surface of the touch screen 107 may be exposed at, substantially parallel to the front surface 103 of the device 101. A user of the portable electronic device 101 may interact with the touch screen 107 by making contact with the front surface of the touch screen by the user's body part 109 and/or an object (not shown) controlled by the user. As shown in FIG. 1, the user may contact the touch screen 107 with the user's finger or other digit 111, but the user may contact the touch screen using a stylus, controller, glove, or similar object.

One or more sensors of the portable electronic device 101 may detect movement of the device in one, two, three, or more directions. For example, as represented in FIG. 1, sensors may detect movement in an x-direction 113 and a y-direction 115 of the device 101, which are both parallel to the front surface 103 of the device and the touch screen 107, but orthogonal to the front surface of the device and the touch sensor. The x-direction 113 and the y-direction 115 are also orthogonal to each other. The sensors may also detect movement in a z-direction 117 of the device 101, which is orthogonal to the x-direction 113 and the y-direction 115 as well as the front surface 103 of the device and the touch screen 107. Although a user may contact the touch screen 107 at many different angles, it is the z-direction 117 which represents the substantial direction of user input to the touch screen by the user. It is to be understood that any reference herein to contact with input component in a z-direction 117 or orthogonal to the surface of the input component includes any varying angle relative to the z-direction and orthogonal directions which may be utilized by a user to contact, such as double tap, the input component.

The embodiment 100 of FIG. 1 further includes an accessory 119 to support the portable electronic device 101. The accessory 119 is not a necessary part of the portable electronic device 101, but it may provide physical and/or functional enhancements to the device. For example, the accessory 119 may be a stand to maintain the portable electronic device 101 at a certain position to facilitate user input at the input component of the portable electronic device. Also, the accessory 119 may include some type of link, such as wired, wireless, electrical, magnetic, optical, acoustic, and the like, to provide or control one or more functions of the portable electronic device 101. For this example, the link may enhance the functionality of the portable electronic device, such as the function of data input, detecting false conditions or managing the wake/sleep state of the device.

Figure 2:
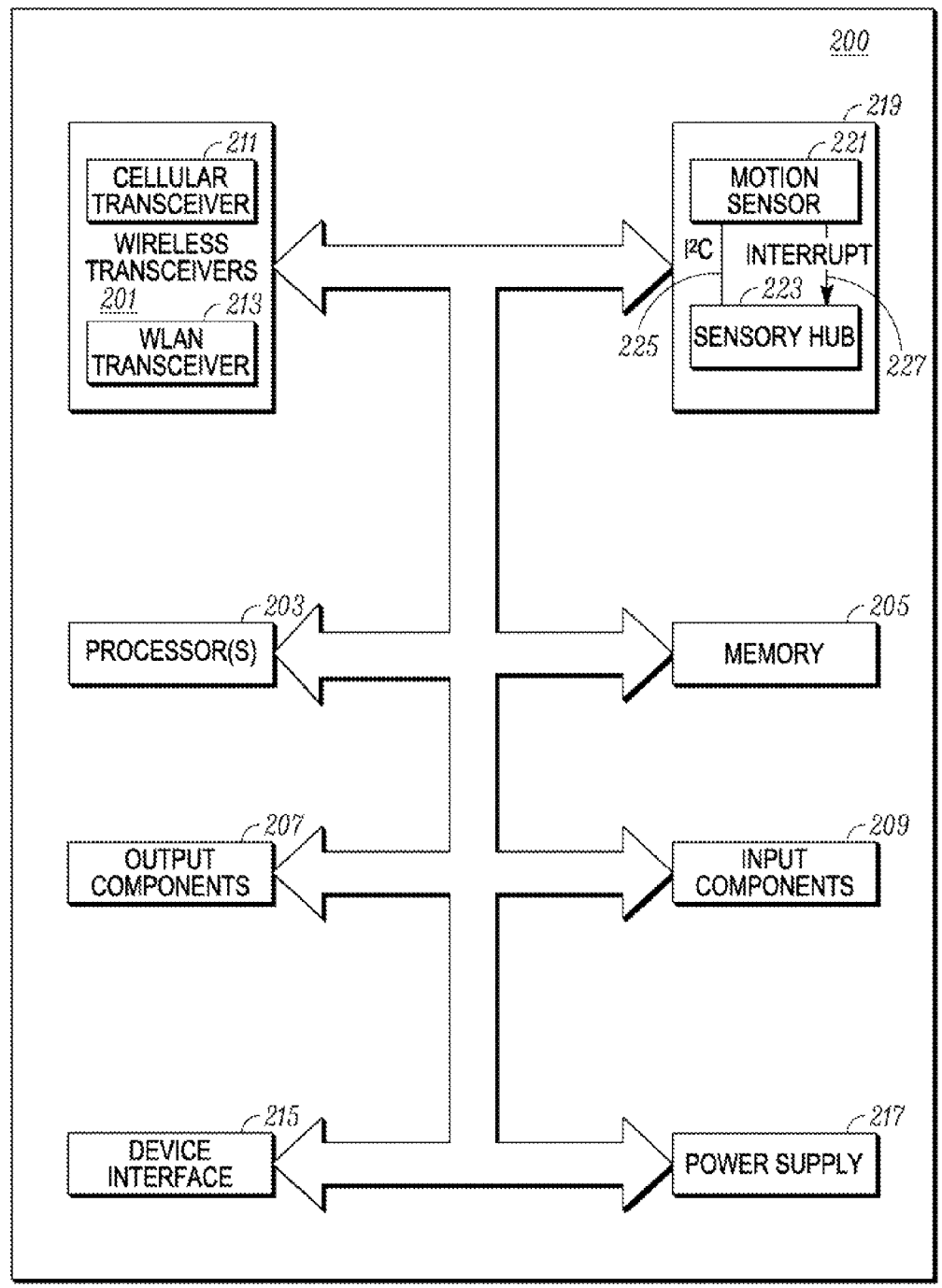
FIG. 2 is a block diagram representing example internal components of a portable electronic device in accordance with the present invention.

Referring to FIG. 2, there is shown a block diagram representing example components 200 that may be used for an embodiment in accordance with the present invention. The example embodiment may include one or more wireless transceivers 201, one or more processors 203, one or more memories 205, one or more output components 207, and one or more input components 209. Each embodiment may include a user interface that comprises one or more output components 207 and/or one or more input components 209. Each wireless transceiver 201 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants, as represented by cellular transceiver 311. Each wireless transceiver 201 may also utilize wireless technology for communication, such as, but are not limited to, peer-to-peer or ad hoc communications such as HomeRF, Bluetooth and IEEE 802.11 (a, b, g or n), wireless HDMI; wireless USB, and other forms of wireless communication such as infrared technology, as represented by WLAN transceiver 213. Also, each transceiver 201 may be a receiver, a transmitter or both.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 include, but is not limited to, operating systems, applications, and data. Each operating system includes executable code that controls basic functions of the portable electronic device 101, such as interaction among the components of the internal components 200, communication with external devices via each transceiver 201 and/or the device interface (see below), and storage and retrieval of applications and data to and from the memory 205. Each application includes executable code utilizing an operating system to provide more specific functionality for the portable electronic device. Data is non-executable code or information that may be referenced and/or manipulated by an operating system or application for performing functions of the portable electronic device 101.

The memory 205 may include various modules to structure or otherwise facilitate certain operations in accordance with the present invention. The memory 205 may include motion data corresponding to criterion associated with user input and non-user input. For one embodiment, the motion data is based on average total acceleration after double tap, in which the average total acceleration is associated with $\sqrt{a_x^2+a_y^2+a_z^2}$. For another embodiment, the motion data is based on a jerk summation after double tap, in which the jerk summation is based on a sum of change of acceleration in three axes associated with $\Delta a_x + \Delta a_y + \Delta a_z$, in which $\Delta$ is the change of adjacent data (derivative). A function of the portable electronic device 101 may be activated in response to the average total acceleration, the jerk summation, or some other method of analyzing motion data within a predetermined time period exceeding a predetermined threshold stored in the memory 205. The memory 205 may store other criterion, such as data associated with more than two intervals, periodic or non-periodic, within the predetermined time period. The memory 205 may store still other criterion, such as random motion data associated with a first interval associated with a first dimension above a first threshold, and a second interval associated with a second dimension above a second threshold, in which the second dimension is different from the first dimension. Yet another criterion that may be stored by the memory 205 includes bump data including at least one interval associated with a dimension orthogonal to a surface of the display, the interval or intervals being above a maximum threshold. The memory 205 may further includes orientation data associated with the portable electronic device, in which the orientation data includes one or more intervals associated with a dimension orthogonal to a surface of the output component, and the interval or intervals may be below a minimum threshold.

The input components 209, such as the touch sensitive surface of the touch screen 107, or other components of the user interface, may produce an input signal in response to detecting a double tap and/or motion subsequent to the double tap. In addition, the input components 209 may include one or more additional components, such as a video input component such as an optical sensor (for example, a camera), an audio input component such as a microphone, and a mechanical input component or activator such as button or key selection sensors, touch pad sensor, another touch-sensitive sensor, capacitive sensor, motion sensor, and switch. Likewise, the output components 207 of the internal components 200 may include one or more video, audio and/or mechanical outputs. For example, the output components 207 may include the visible display of the touch screen 107. Other output components 207 may include a video output component such as a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

The internal components 200 may further include a device interface 215 to provide a direct connection to auxiliary components or accessories for additional or enhanced functionality. In addition, the internal components 200 preferably include a power source 217, such as a portable battery, for providing power to the other internal components and allow portability of the portable electronic device 100.

Although the input components 209 include one or more sensors, a separate representation of the sensors is shown in FIG. 2 due to the important of these sensors for the various embodiments herein. The portable electronic device 101 comprises a sensor circuit 219 configured to detect double tap data and motion data associated with user input subsequent to the double tap data within a predetermined time period. The sensor circuit 219 may also determine whether the motion data corresponds to one or more criteria associated with non-user input. It is to be understood that other components of example components 200, such as the processor 203, may determine whether the motion data corresponds to one or more criteria associated with non-user input. For one embodiment, the sensor circuit 219 includes a motion sensor 221 to detect the motion data and a sensor hub 223 to determine whether the motion data corresponds to the one or more criteria. The motion sensor 221 and the sensory hub 223 may use various communication means to communicate with each other. For another embodiment, the motion sensor 221 and the sensory hub 223 may include a multi-master serial single-ended bus, such as an Inter-Integrated Circuit or two-wire interface 225, for communication with each other. For yet another embodiment, the motion sensor 221 and the sensory hub 223 may include an asynchronous signal, such as an interrupt line 227, to indicate the need for attention or a synchronous event indicating a need for a change in process execution. For example, the interrupt line 227 may be used to communicate a double tap interrupt from the motion sensor 221 to the sensor hub 223 when the portable electronic device 101 is in a sleep state. The double tap interrupt may indicate a possible situation where a double tap by the user, or some other detected motion, is detected by the input component.

It is to be understood that FIG. 2 is provided for illustrative purposes only and for illustrating components of a portable electronic device 101 in accordance with the present invention, and is not intended to be a complete schematic diagram of the various components required for a portable electronic device. Therefore, a portable electronic device may include various other components not shown in FIG. 2, or may include a combination of two or more components or a division of a particular component into two or more separate components, and still be within the scope of the present invention.

Figure 3:
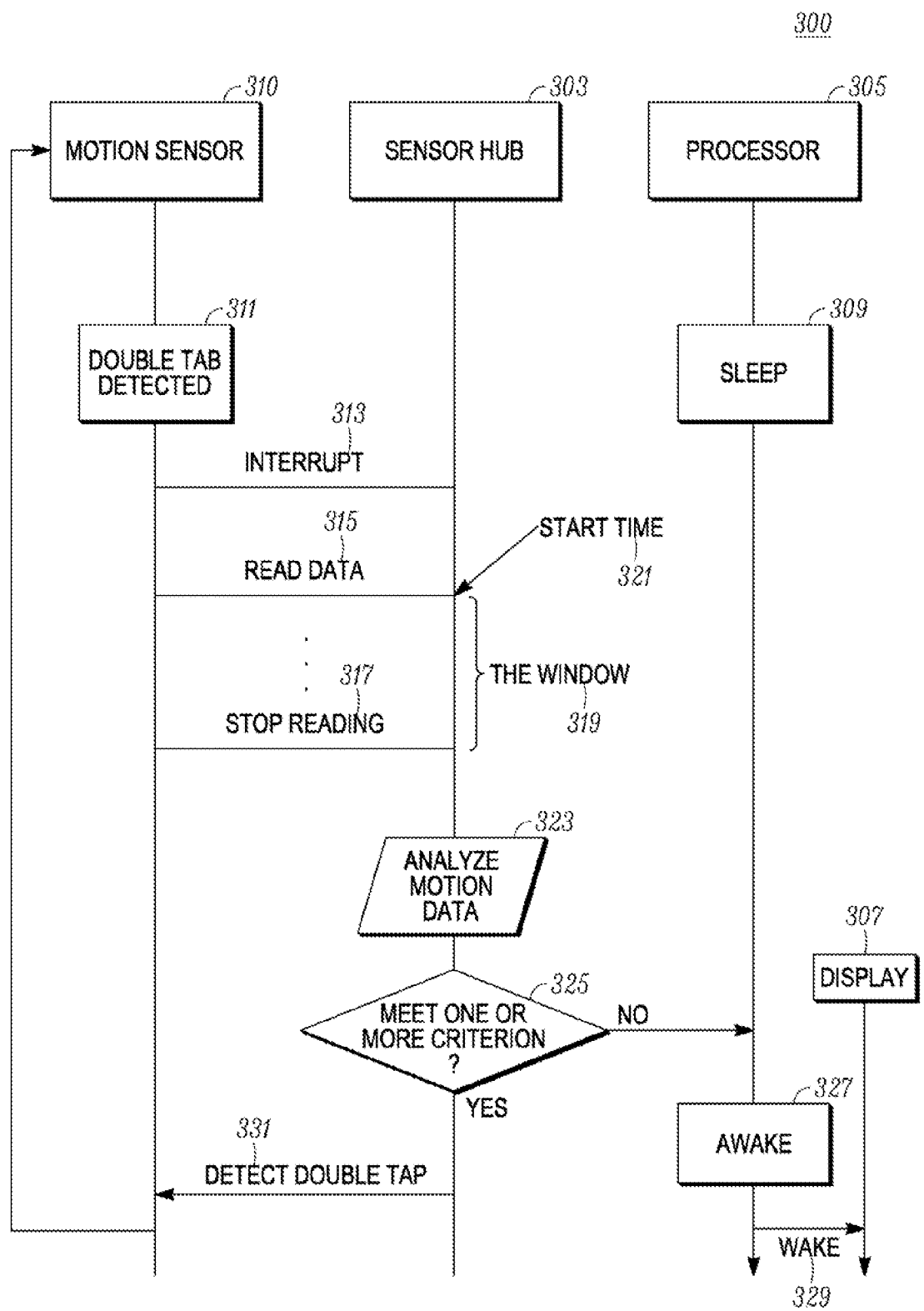
FIG. 3 is a timing diagram representing an example operation of a portable electronic device in accordance with the present invention.

Referring to FIG. 3, there is provided a timing diagram representing an example operation 300 of the portable electronic device 101. FIG. 3 illustrates an example of interaction among a sensor hub 303, a processor 305, a motion sensor 310 and a display 307 of the portable electronic device 101. It is to be understood that the operation represented by FIG. 3 may be performed by a variety of components and configuration of the portable electronic device, and is not restricted to the components shown. For example, the portable electronic device 101 may comprise a sensor circuit that performs the operation of the sensor hub 303 and the motion sensor 310. It is also to be understood that the motion sensor 310 represents any type of sensor and is not restrict a sensor or sensors that detect motion.

At some point, during the operation of the portable electronic device 101, the processor 305 may detect a sleep state of the display 307 at step 309. Subsequently, the motion sensor may detect a user input by a user that may be associated with a double tap action by the user. A double tap is generally known in the art to be contact at a user interface of a device by a user, twice in succession, within a short period of time. Typically, the contact is by the user's hand or a part thereof, or by an object manipulated by the user's hand, such as a stylus. In response to detecting the user input associated with a double tap, the motion sensor 310 may send a signal to the sensor hub 303 at step 313 to indicate that the user input has been received. The motion sensor 310 may also initiate data collection at step 315, in response to detecting the user input at step 311 or in response to sending the signal at step 313. The motion sensor 310 then terminates data collection of motion data subsequent to the double tap data within a predetermined time period at step 317. The motion sensor 310 may also send the data collected during the predetermined time period to the sensor hub 303 while it is collected or after it is collected. The time window 319 for collecting the motion data may correspond to the predetermined time period, and the start time 321 of the collected data may correspond to the time when motion data is initially collected.

After collecting the motion data subsequent to the double tap, the operation 300 analyzes the motion data at step 323 to whether the motion indicates one or more false wake conditions. Thus, the portable electronic device 101 analyzes the motion data trailing the double tap event to distinguish error or non-user input conditions from normal or user input conditions. In response to analyzing the motion data, the operation 300 determines whether the analysis results may be associated with one or more predetermined criteria associated with error or non-user input conditions at step 325. Examples of error or non-user input conditions include bumping from road surface while in a moving vehicle, bumping from another object (such as, a user's body) while being transported or carried, and bumping from placement at or removal from a surface. Post double tap motion analysis may be performed based on a single axis, two axes, or all three axes. The analysis may also include calculations based on total acceleration or jerk summation. An indication of bumping from a road surface includes a periodic motion, which may be a signature of riding on a rough road surface. An indication of bumping from another object includes identification of one or more high interval or peak values in the one or two axes, particularly axes orthogonal to a surface of the display, which may be a signature of random motion. Thus, the criterion may comprise random motion data associated with a first interval associated with a first dimension above a first threshold, and a second interval associated with a second dimension above a second threshold, in which the second dimension is different from the first dimension. An indication of bumping from a surface includes one or more high interval or peak values in the direction orthogonal to a surface of the display, which may due to bumping from the surface. An indication of a vertical orientation relative to gravity includes a low interval or peak value in the z-direction, indicating that the portable electronic device 101 may be carried in a vertical direction. The overall amount of motion, such as average acceleration, after a double tap interrupt may be an indication of whether it is in one of the above error cases.

If the analysis results of step 323 do not correspond to any criterion associated with error or non-user input at step 325, then the sensor hub 303 may indicate to the processor 305 that the display 307 should change from a sleep state to a wake state at step 327, and the processor may send a wake signal to the display at step 329. In the alternative, the sensor hub 303 may send the wake signal directly to the display 307 at step 329.

On the other hand, if the analysis results of step 323 correspond to one or more criteria associated with error or non-user input at step 325, then the sensor hub 303 and/or processor 305 may maintain the display 307 at the sleep state in response. Thus, the sensor hub 303 may indicate to the motion sensor 310 that the operation 300 should continue to wait for a user input corresponding to a double tap, i.e., detect a second double tap data and second motion data subsequent to the second double tap data.

Figure 4:
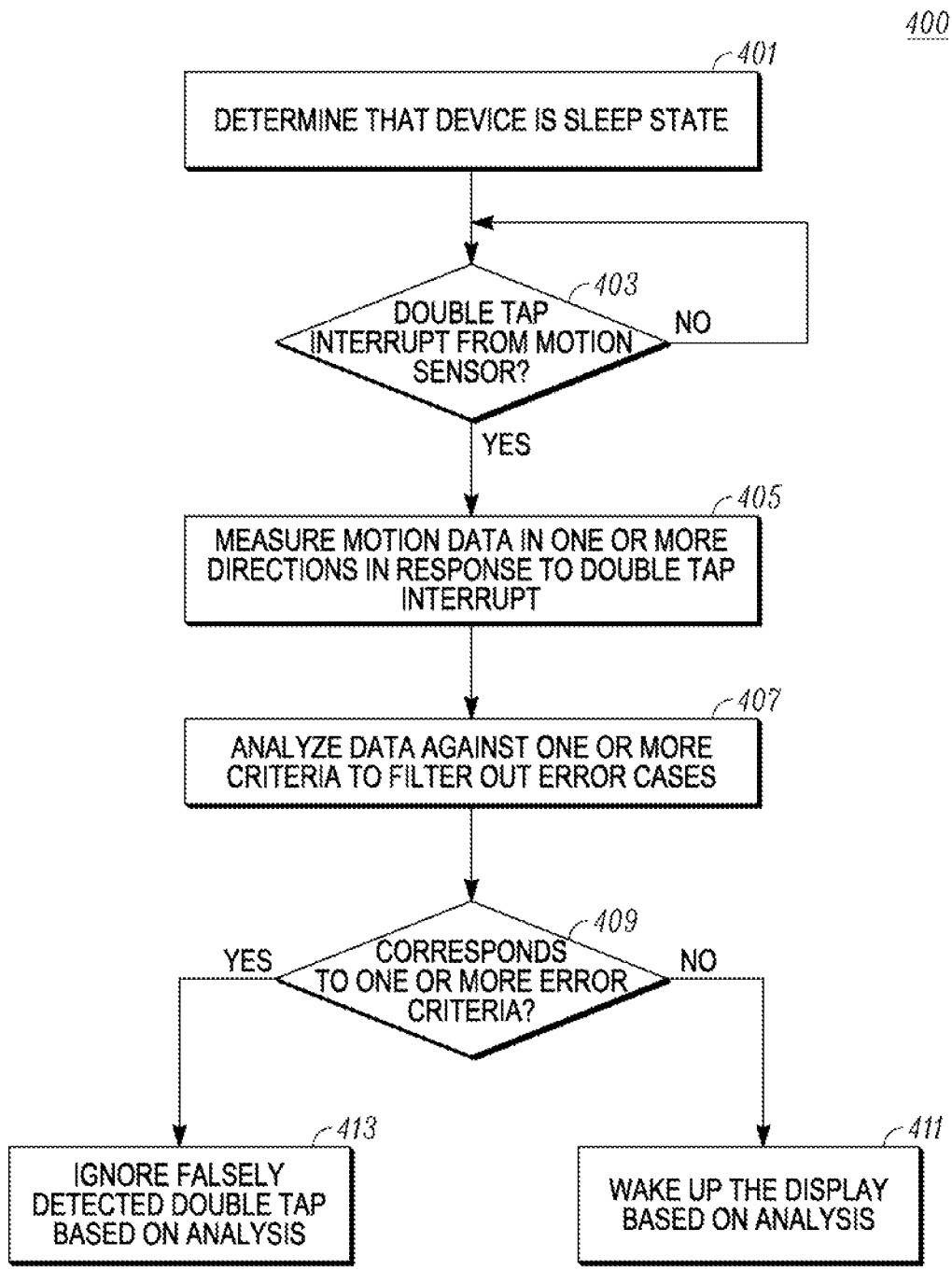
FIG. 4 is a flow diagram representing an example operation of a portable electronic device in accordance with the present invention.

Referring to FIG. 4, there is provided a flow diagram representing an example operation 400 of the portable electronic device 101. It is to be understood that operation 400 may be performed by a sensor circuit, a motion sensor, a sensor hub or a processor of the portable electronic device 101. Initially, at step 401, the operation 400 determines that the display of the portable electronic device 101 is in some type of sleep state. Next, the operation 400 detects double tap data associated with user input and motion data subsequent to the double tap data within a predetermined time period at step 403. The operation 400 then measures motion data in one or more directions of a three-dimensional space (such as an x-direction, a y-direction, and a z-direction) in response to the detecting double tap data and the motion data subsequent to the double tap data, at step 405. Thereafter, the operation 400 determines whether motion data corresponds to one or more criteria associated with non-user input, as described throughout this description, at step 407.

In response to analyzing the motion data at step 407, the operation 400 may determine whether the analysis results may be associated with one or more predetermined criteria associated with error or non-user input conditions at step 409. If none of the analysis results may be associated with one or more predetermined criteria associated with error or non-user input conditions, then the operation 400 may proceed with waking the display from a sleep state to a wake state in response to determining that the motion data corresponds to one or more criteria. If, on the other hand, the analysis results may be associated with one or more predetermined criteria associated with error or non-user input conditions, then the operation 400 may ignore the falsely detected user input associated with double tap based on the analysis at step 413. The display may be maintained at the sleep state in response to determining that the motion data does not correspond to one or more criteria, and the operation 400 may wait to detect a second double tap data and second motion data subsequent to the second double tap data.

Figure 5:
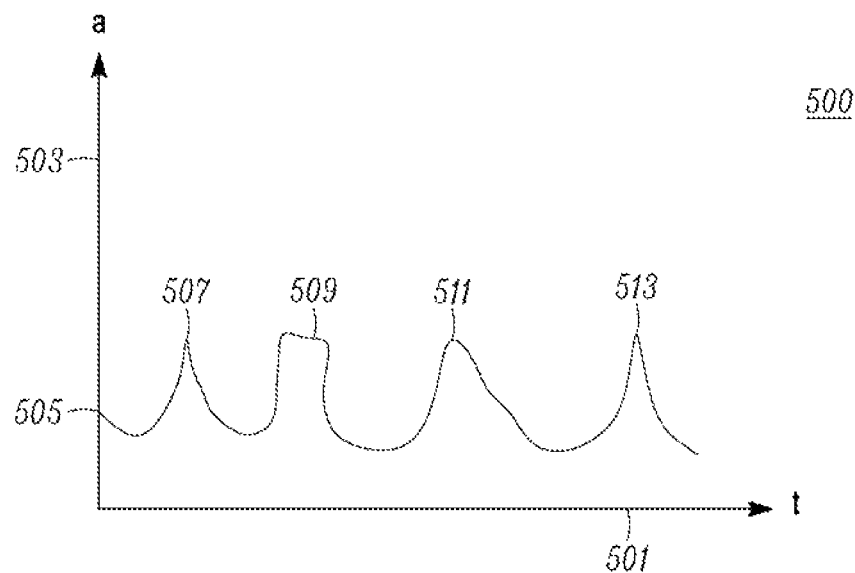
FIG. 5 is a graphical illustration representing a periodic nature of an embodiment in accordance with the present invention.

Referring to FIG. 5, there is provided a graphical illustration representing a periodic nature 500 of an embodiment. In FIG. 5, the "t" axis 501 represents time in fractions of a second, and the "a" axis 503 represents the amplitude of the collected data 505, including the double tap data and motion data subsequent to the double tap data. A proper wake indication would provide double tap data with two intervals and subdued (substantially lower amplitudes) for the motion data. As represented in FIG. 5, periodic intervals of more than two intervals would indicate an error or non-user input condition. For example, collected data 505 may indicate of bumping from transport, such as transport over a road surface. Thus, one or more criteria may include data that is periodic and/or associated with more than two intervals within the predetermined time period.

Figure 6:
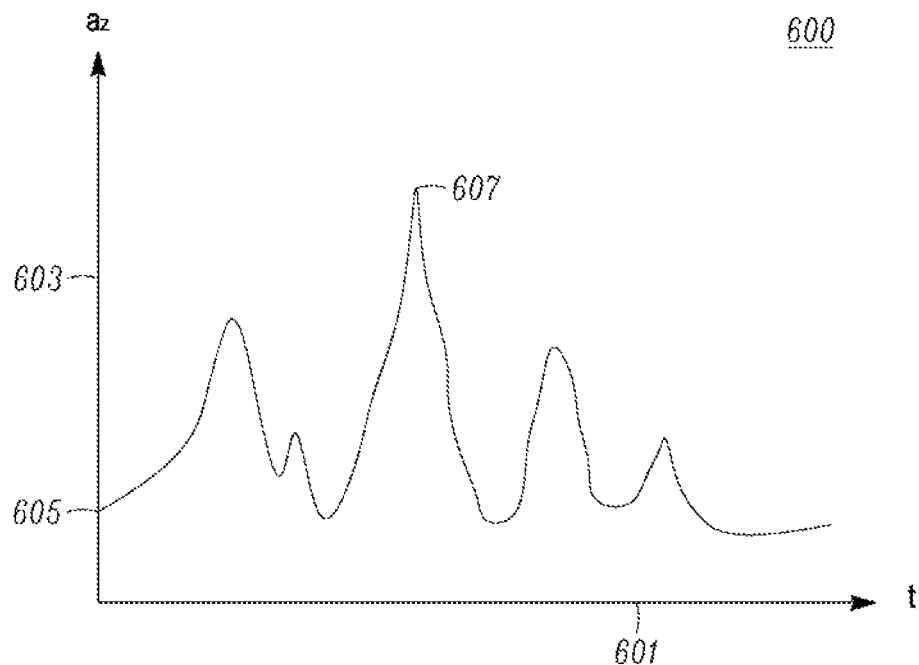
FIG. 6 is a graphical illustration representing a high z-direction interval in accordance with the present invention.

Referring to FIG. 6, there is provided a graphical illustration representing a high z-direction interval 600. In FIG. 6, the "t" axis 501 represents time in fractions of a second, and the "$a_z$" axis 603 represents the amplitude of the collected data 605, including the double tap data and motion data subsequent to the double tap data. As stated above, an indication of bumping from another object may include identification of one or more high interval or peak values 607 in the one or two axes, particularly axes orthogonal to orthogonal to a surface of the display, which may be an signature of random motion. Thus, the criterion may comprise bump data including at least one interval associated with a dimension orthogonal to a surface of the display, in which the interval or intervals are above a maximum threshold.

Figure 7:
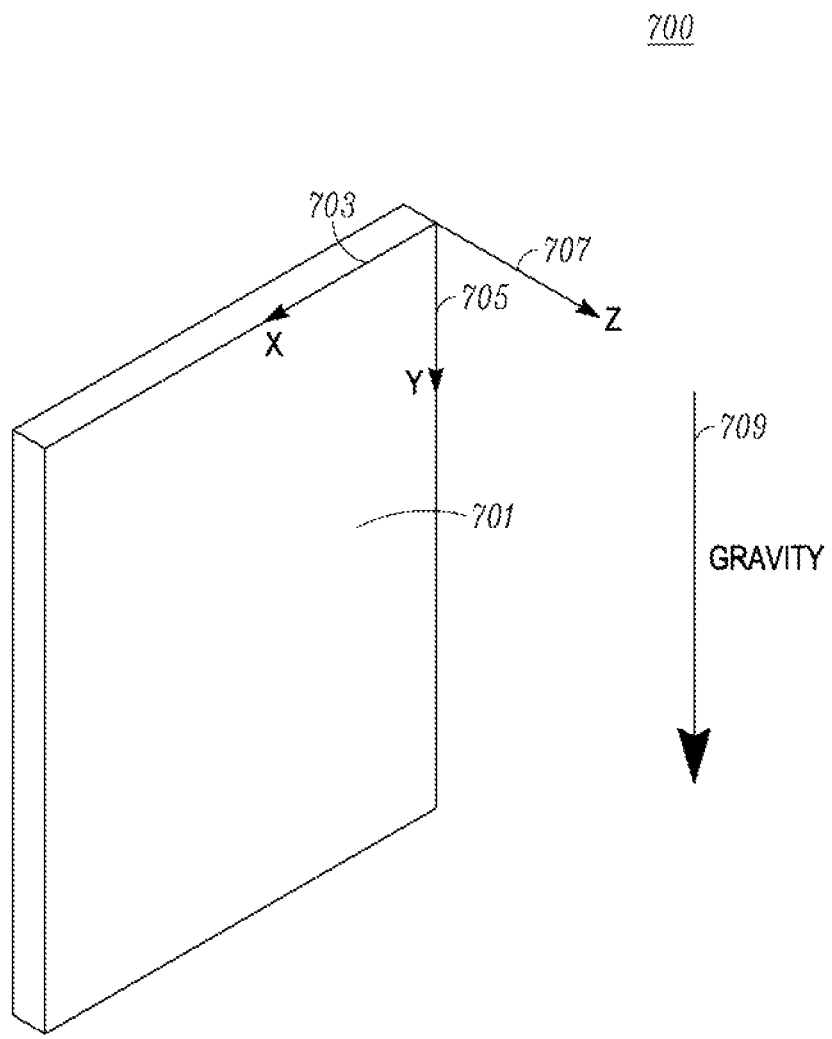
FIG. 7 is a graphical illustration representing a low z-direction interval in accordance with the present invention.

Referring to FIG. 7, there is provided a graphical illustration representing a low z-direction interval 700. In FIG. 7, the portable electronic device 701 may be oriented in a vertical orientation relative to gravity 709 and, thus, is less likely to be subject to an intentional double tap user input by a user. The portable electronic device 701 may be associated with three coordinate directions, such as x-direction 703, y-direction 705, and z-direction 707. The x-direction and y-direction correspond to the larger dimensions of the device, and the z-direction corresponds to the shorted dimension of the device and represents a direction orthogonal to a surface of the display. One or more criteria may include orientation data associated with the portable electronic device 701. An indication of a vertical orientation relative to gravity 709 includes a low interval or peak value in the z-direction, indicating that the portable electronic device 701 may be carried in a vertical direction. Thus, the orientation data may include at least one interval associated with a dimension orthogonal to a surface of the display, in which the interval or intervals may being below a minimum threshold.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method comprising:
   detecting, at a sensor circuit of a portable electronic device, movement associated with a double tap input provided at a display of the portable electronic device;
   detecting, at the sensor circuit, movement of the portable electronic device occurring subsequent to detection of the double tap input;
   determining, at the sensor circuit, whether the movement of the portable electronic device occurring subsequent to detection of the double tap input corresponds to at least one false wake condition, wherein:
     the at least one false wake condition includes orientation data associated with the portable electronic device, and
     the orientation data includes at least one interval associated with a dimension orthogonal to a surface of the display, the at least one interval being below a minimum threshold; and
   waking the display from a sleep state in response to determining that the movement of the portable electronic device occurring subsequent to detection of the double tap input does not correspond to the at least one false wake condition.

2. The method of claim 1, further wherein the display is configured to remain in the sleep state in response to the sensor circuit determining that the movement of the portable electronic device occurring subsequent to detection of the double tap input corresponds to at least one false wake condition.

3. The method of claim 1, wherein:
the false wake condition is based on average total acceleration after double tap, the average total acceleration being associated with $\sqrt{}${square root over $(\alpha_x^2+\alpha_y^2+\alpha_z^2)$}, and
the average total acceleration within a predetermined time period subsequent to detection of the double tap input exceeds a predetermined threshold,
where $\alpha_x$ is an acceleration in the x-direction, $\alpha_y$ is an acceleration in the y-direction, and $\alpha_z$ is an acceleration in the z-direction.

4. The method of claim 1, wherein:
the false wake condition is based on a jerk summation detected after double tap, the jerk summation being a sum of change of acceleration in a plurality of axes associated with $\Delta\alpha_x+\Delta\alpha_y+\Delta\alpha_z$, and the jerk summation is detected within a predetermined time period subsequent to detection of the double tap input exceeds a predetermined threshold, where $\Delta\alpha_x$ is a change in an acceleration in the x-direction, $\Delta\alpha_y$ is a change in an acceleration in the y-direction, and $\Delta\alpha_z$ is a change in an acceleration in the z-direction.

5. The method of claim 1, wherein the at least one false wake condition includes data associated with more than two intervals within a predetermined time period subsequent to detection of the double tap input.

6. The method of claim 5, wherein the intervals of the associated data are periodic.

7. The method of claim 1, wherein the at least one false wake condition comprises random motion data associated with a first interval associated with a first dimension above a first threshold, and a second interval associated with a second dimension above a second threshold, wherein the second dimension is different from the first dimension.

8. The method of claim 1, wherein the at least one false wake condition includes bump data including at least one interval associated with a dimension orthogonal to a surface of the display, the at least one interval being above a maximum threshold.

9. A portable electronic device comprising:
a display; and
a sensor circuit configured to:
detect movement associated with a double tap input provided at a display of the portable electronic device,
detect movement of the portable electronic device occurring subsequent to the detection of the double tap input,
determine whether the movement of the portable electronic device occurring subsequent to the detection of the double tap input corresponds to at least one false wake condition, wherein:
the at least one false wake condition includes orientation data associated with the portable electronic device, and
the orientation data includes at least one interval associated with a dimension orthogonal to a surface of the display, the at least one interval being below a minimum threshold, and
wake the display from a sleep state in response to determining that the movement of the portable electronic device occurring subsequent to the detection of the double tap input does not correspond to the at least one false wake condition.

10. The portable electronic device of claim 9, wherein the sensor circuit includes a motion sensor to detect the movement of the portable electronic device occurring subsequent to the detection of the double tap input and a sensor hub to determine whether the movement of the portable electronic device occurring subsequent to the detection of the double tap input corresponds to the at least one false wake condition.

11. The portable electronic device of claim 9, wherein the display is configured to remain in the sleep state in response to the sensor circuit determining that the movement of the portable electronic device occurring subsequent to the detection of the double tap input does not correspond to the at least one false wake condition.

12. The portable electronic device of claim 9, wherein:
the at least one false wake condition is based on average total acceleration after double tap associated with $\sqrt{}${square root over $(\alpha_x^2\alpha_y^2+\alpha_z^2)$}, and
the average total acceleration within a predetermined time period subsequent to detection of the double tap input exceeds a predetermined threshold,
where $\alpha_x$ is an acceleration in the x-direction, $\alpha_y$ is an acceleration in the y-direction, and $\alpha_z$ is an acceleration in the z-direction.

13. The portable electronic device of claim 9, wherein:
the at least one false wake condition is based on a jerk summation detected after double tap, the jerk summation being a sum of change of acceleration in a plurality of axes associated with $\Delta\alpha_x+\Delta\alpha_y+\Delta\alpha_z$, and
the jerk summation is detected within a predetermined time period subsequent to detection of the double tap input exceeds a predetermined threshold,
where $\alpha_x$ is an acceleration in the x-direction, $\alpha_y$ is an acceleration in the y-direction, and $\alpha_z$ is an acceleration in the z-direction.

14. The portable electronic device of claim 9, wherein the at least one false wake condition includes data associated with more than two intervals within a predetermined time period subsequent to detection of the double tap input.

15. The method of claim 14, wherein the intervals of the associated data are periodic.

16. The portable electronic device of claim 9, wherein the at least one false wake condition comprises random motion data associated with:
a first interval associated with a first dimension above a first threshold, and
a second interval associated with a second dimension above a second threshold, wherein the second dimension is different from the first dimension.

17. The portable electronic device of claim 9, wherein the at least one false wake condition includes bump data including at least one interval associated with a dimension orthogonal to a surface of the display, the at least one interval being above a maximum threshold.

18. A non-transitory computer-readable storage medium comprising instructions that, when executed by at least one processor of a sensor circuit of a portable computing device, cause the sensor circuit to:
detect movement associated with a double tap input provided at a display of the portable electronic device;
detect movement of the portable electronic device occurring subsequent to detection of the double tap input;
determine whether the movement of the portable electronic device occurring subsequent to detection of the double tap input corresponds to at least one false wake condition, wherein:

the at least one false wake condition includes orientation data associated with the portable electronic device, and the orientation data includes at least one interval associated with a dimension orthogonal to a surface of the display, the at least one interval being below a minimum threshold; and wake the display from a sleep state in response to determining that the movement of the portable electronic device occurring subsequent to detection of the double tap input does not correspond to the at least one false wake condition.

* * * * *

UNITED STATES PATENT AND TRADEMARK OFFICE
CERTIFICATE OF CORRECTION

PATENT NO.         : 9,710,048 B2
APPLICATION NO.    : 13/251632
DATED              : July 18, 2017
INVENTOR(S)        : Hong Zhao, Dennis J. Budnick and Makarand M. Karvekar It is certified that error appears in the above-identified patent and that said Letters Patent is hereby corrected as shown below:

In the Claims

Column 8, Line 65 (Claim 2): "further wherein the display" should read --wherein the display--

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*